US011381104B2

United States Patent
Rastegar

(10) Patent No.: US 11,381,104 B2
(45) Date of Patent: Jul. 5, 2022

(54) ENERGY SYSTEM FOR EMPLACED MUNITIONS

(71) Applicant: Omnitek Partners LLC, Ronkonkoma, NY (US)

(72) Inventor: Jahangir S Rastegar, Stony Brook, NY (US)

(*) Notice: Subject to any disclaimer, the term of this patent is extended or adjusted under 35 U.S.C. 154(b) by 305 days.

(21) Appl. No.: 16/401,081

(22) Filed: May 1, 2019

(65) Prior Publication Data

US 2019/0393717 A1 Dec. 26, 2019

Related U.S. Application Data

(60) Provisional application No. 62/668,178, filed on May 7, 2018.

(51) Int. Cl.
*H02J 7/34* (2006.01)
*H01M 10/0525* (2010.01)

(52) U.S. Cl.
CPC ........... *H02J 7/34* (2013.01); *H01M 10/0525* (2013.01)

(58) Field of Classification Search
CPC ............................ H02J 7/34; H01M 10/0525
USPC ......... 320/101, 110, 112, 119, 120, 124, 166
See application file for complete search history.

(56) References Cited

U.S. PATENT DOCUMENTS

| | | | | |
|---|---|---|---|---|
| 11,128,005 | B2* | 9/2021 | Wyatt | H01M 50/543 |
| 2006/0292443 | A1* | 12/2006 | Ogg | H01M 10/0477 |
| | | | | 429/185 |
| 2014/0093760 | A1* | 4/2014 | Hermann | H01M 10/441 |
| | | | | 429/66 |
| 2015/0037649 | A1* | 2/2015 | Wyatt | H01M 10/655 |
| | | | | 429/120 |
| 2015/0037662 | A1* | 2/2015 | Pinon | H01M 50/502 |
| | | | | 429/179 |
| 2018/0108878 | A1* | 4/2018 | Fees | H01M 50/10 |
| 2018/0205055 | A1* | 7/2018 | Hilligoss | H01M 10/482 |
| 2019/0221883 | A1* | 7/2019 | Read | H01M 4/483 |
| 2020/0227779 | A1* | 7/2020 | Read | H01M 4/521 |
| 2021/0273228 | A1* | 9/2021 | Hashim | H01M 4/0428 |
| 2021/0288384 | A1* | 9/2021 | Fees | H01M 50/171 |
| 2022/0045394 | A1* | 2/2022 | Osborne | H01M 10/482 |

* cited by examiner

*Primary Examiner* — Phallaka Kik

(57) ABSTRACT

An energy system for providing electrical energy to a device where the energy system includes: a first battery for providing a first electrical power over a first time period; a second battery for providing a second electrical power over a second time period, the second battery being a type different from a type of the first battery, the second power being greater than the first power and the second time period being smaller than the first time period; and a controller for controlling initiation of the first battery and the second battery at predetermined times to satisfy a specific power requirement of the device over a time period including the first and second time periods.

3 Claims, 7 Drawing Sheets

ENERGY SYSTEM FOR EMPLACED MUNITIONS

CROSS-REFERENCE TO RELATED APPLICATION

This application claims the benefit of earlier U.S. Provisional Application No. 62/668,178, filed on May 7, 2018, the entire contents thereof being incorporated herein by reference.

BACKGROUND

1. Field

The present invention relates generally to an energy system and more particularly to an energy system for emplaced munitions.

2. Prior Art

Current technology for reserve energy storage devices forces users to select type based on inherent limitations or weaknesses posed by the cell depending upon type (e.g., thermal or liquid reserve batteries or lithium-ion based reserve batteries). The different types of power sources have various strengths and weaknesses.

SUMMARY

To provide diverse applications and the need for broad performance across a broad range of products, different cell type strengths are integrated into a single power source system (energy system) that can be readily optimized for a broad range of applications. This approach serves to improve reliability, availability, while improving energy performance of the powering system, while at the same time significantly reducing overall costs.

Needed are reserve energy systems with "smart" energy management architectures and methods to be initiated using launch forces or electrically initiated with programmable features to provide "power on demand" capability to optimally match the requirements of differing missions. Prior to activation, the reserve power system can remain in a quiescent state with zero self-discharge, power drain or leakage. Activation may occur via remote control or various triggering mechanisms, thus providing the stored energy only when needed. Once initiated, the energy storage system can provide fast initiation characteristics to full operational voltage. The "smart energy management" system can be provided with the required protocol to optimally control the generation, storage and flow of electrical energy on demand and minimize energy losses to optimize total munitions energy consumption and thereby the overall energy system size. Thus, the "smart energy management system" is capable of monitoring, regulating, informing the onboard information system within the munition of the amount of energy that has been consumed and that is still available for the mission, and the number of high-power pulses available during the entire period of munitions mission, at any point within the mission.

The electrochemical architectures can be scalable and capable of being readily integrated with sensory and other electronic gear, for example with means of communication with outside command and control stations and employ reserve and primary batteries as well as thermal or liquid reserve batteries.

To make the power energy system immune to Electromagnetic Interference (EMI) and Electromagnetic Pulse (EMP), the energy system can be positioned within a Faraday cage and be activated by internally positioned mechanisms and/or by an external stimulus provided through optical powering and communications links.

The energy system and its smart energy management systems can be able to provide a relatively low electrical power, such as on the order of 10 mW, to munitions for a period of, for example, 30 days, while be able to provide several high-power pulses, such as on the order of 500 mA, for a smaller time period, such as around 1 second. The power system can use appropriate electrochemistry that can provide energy at the required levels for a period of, for example, 30 days.

As required for most munitions, the energy system and all its components can be gun hardened to withstand setback and set-forward and balloting shocks and flight induced vibration, can have a shelf life of over 20 years, and can be safe and meet all military operational and storage temperature requirements of for example, −65 deg. F. to 165 deg. F. The energy system can have a shock survivability requirement, such as over 100,000 Gs.

In addition, the architecture of the energy system can be such that would facilitate packaging of its components and integration with other currently perceived and potential future munitions sensor, control electronics, optical power and communications links, etc. The energy system can also lend itself to fabrication using available mass production processes developed for commercial applications to achieve low cost and high reliability.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION

Provided herein is an energy system for emplaced munitions, which is provided with a smart energy management system and protocol that uses two types of reserve batteries, one for providing the required low power for a longer period, such as over 30 days, and one to provide several high-power pulses on demand. The energy system may either be activated internally due to firing setback acceleration or ground impact or may be activated manually through a piezoelectric generator or a coded optical powering and communication link.

Figure 1:
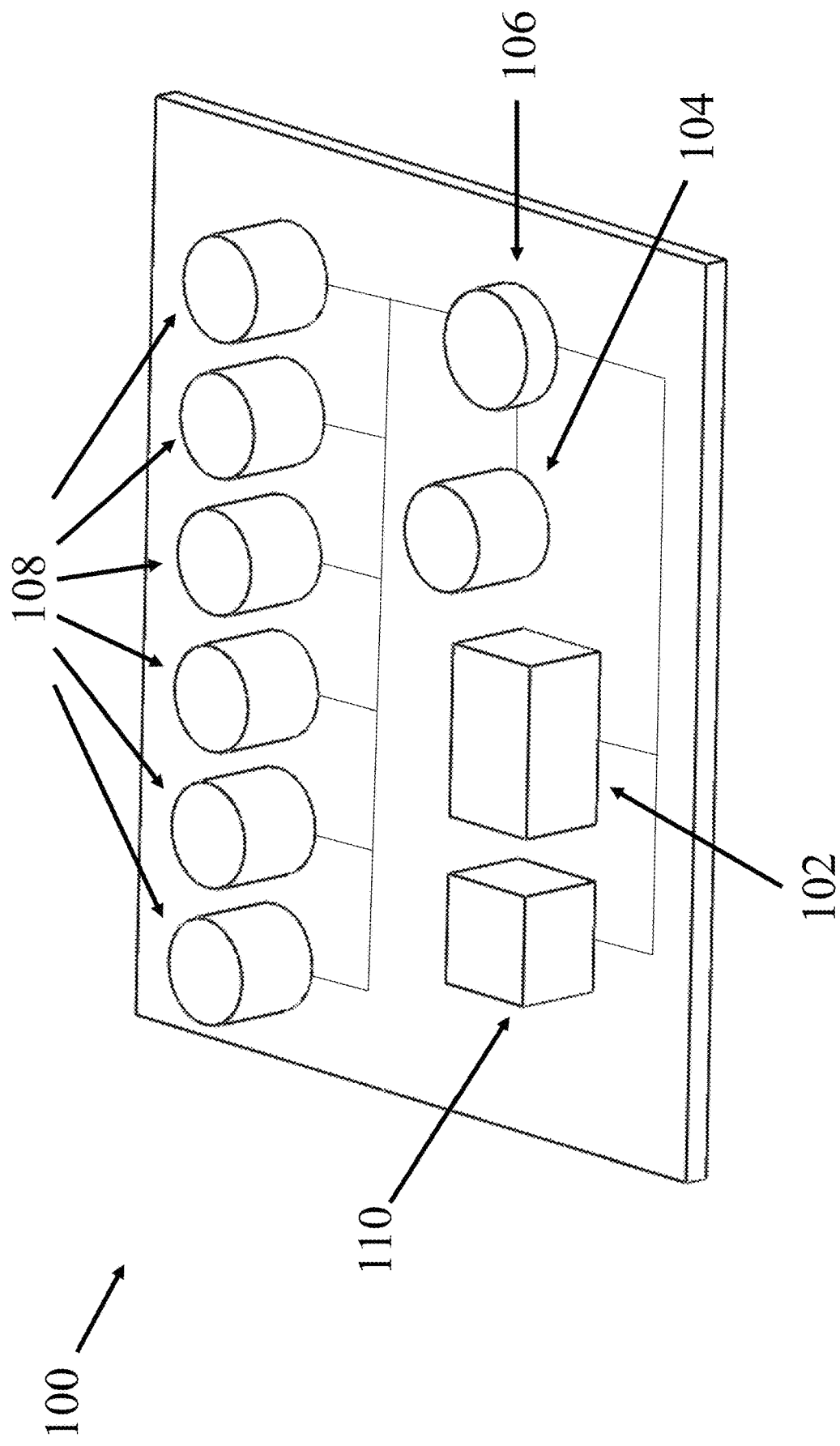
FIG. 1 illustrates a schematic view of a reserve power system for munitions.

A basic architecture of the proposed novel energy system for powering emplaced munitions application is shown in the schematic of FIG. 1 and referenced in general by reference numeral 100. In this energy system 100, the low power (of the order of 10 mW for a period of 30 days upon initiation for the present emplace munitions application) is to be provided by the Li-ion based reserve battery 102.

At least two initiation options are considered. Firstly, a manually operated push-button mass-spring type piezoelectric based electrical generator (not shown) may be used to charge the indicated Li-ion reserve battery initiation capacitor 104, as shown in FIG. 1. Firstly, shock loading hardened piezoelectric electrical energy harvesters for self-powered electrical initiators are known in the art. The low power requirement of such a manually operated piezoelectric generator makes it very small in volume.

Secondly, an optical coupling with two-way communications technology may be used to charge the initiation capacitor 104 and send a coded command to the energy system control unit 106 to activate the Li-ion reserve battery at the desired time. See the optical powering and data transfer disclosed in U.S. Pat. Nos. 6,892,644 and 9,383,180, the contents of each of which being incorporated herein by reference. The coded optical activation signal provides protection against accidental and unauthorized activation and for safety. The use such optical technology allows for: a) rapid powering with simultaneous data transfer; and b) a free-space and across electronics potting material communications bus for wire-free linking of sensors, actuators, processors, communications and other components within the munitions housing would make the entire system immune to EMI and EMP and jamming and spoofing threats. The communications bus is IR based and uses commercially available IR transceivers and industry standard communications protocol for data transfer in free space as well as through potting material used to harden electronic components and boards in munitions.

The control unit 106 is configured as hardware and software and may be one or more circuits, a CPU, a PLC, a computer or the like.

In the schematic of FIG. 1 and for the sake of visual clarity, the energy system 100 is shown to include several relatively small thermal reserve batteries 108. In the actual energy system, these thermal reserve batteries 108 are intended to be packaged in a single multi-stage battery (see FIG. 4) to reduce the overall size by: (a) eliminating individual top and bottom caps; (b) by increasing thermal insulation for each battery cell; and (c) minimizing the overall space that is occupied by a group of individual thermal batteries. Each individual thermal battery cell is initiated electrically on demand. The size of the individual thermal battery cells of the multi-stage thermal battery may vary to match the power requirement of the individual application to be powered. One or more energy storage device 110, such as a capacitor or super-capacitor may be provided to store the electrical energy that remains in each individual thermal battery cell following its activation and completion of the application (mission) that it has powered to minimize the total electrical energy to be generated by the overall energy system.

The control unit 106 is also provided to generate Li-ion and thermal battery reserve battery initiation commands. The control unit 106 functions can be performed via provided software in the munitions main processor. Alternatively, a separate processor may be provided to perform the required functions. The control unit 106 and its operating software is intended to function as a "smart energy management system" to operate the proposed energy system 100.

The electrical storage device 110 such as a capacitor or super-capacitor may also be provided as shown in FIG. 1. A function of the electrical storage device 110 is to store excess electrical energy that is left in each individually activated thermal battery at the completion of the intended mission powering cycle. The electrical storage device 110 may also be charged optically as the munitions is optically activated. The provision of such an electrical storage device 110, particularly if a super-capacitor with the required 20 years shelf life becomes available, is to minimize the amount of electrical energy that the reserve batteries must generate, and thereby the overall size of the munitions energy system 100.

The two initiation options are provided to cover operational and deployment modes of emplaced munitions. Firstly, a manually operated push button mass-spring type piezoelectric based electrical generator may be used to initiate the low-power Li-ion reserve battery (See, for example, U.S. Pat. Nos. 7,312,557, 7,701,120 and 9,470, 497, the contents of which are incorporated herein by reference). Secondly, an optical coupling with two-way communications link may be used to initiate the Li-ion battery by a coded command.

Thermal batteries represent a class of reserve batteries that operate at high temperatures. In thermal batteries the electrolyte is already in the cells and therefore does not require a distribution mechanism such as spinning. The electrolyte is dry, solid and non-conductive, thereby leaving the battery in a non-operational and inert condition. These batteries incorporate pyrotechnic heat sources to melt the electrolyte just prior to use to make them electrically conductive and thereby making the battery active. Insulation and sometimes internal heat sinks are used to maintain the electrolyte in its molten and conductive condition during the time of use. The batteries are encased in a hermetically-sealed metal container and have a very long shelf life of well over 20 years.

Thermal batteries have long been used in munitions and other similar applications to provide a relatively large amount of power during a relatively short period of time, which makes them particularly suitable for an emplaced munitions application.

The run time of thermal batteries is dependent on their size, i.e., the amount of initial generated and available heat versus its surface area, and the amount of insulation used to minimize heat loss. The run time becomes particularly an issue for emplaced munitions since the high-power impulses may even be days apart and require only a few Joules of electrical energy, therefore there is a need to have a small battery cell. Such small battery cells must, however, have enough thermal mass and insulation to successfully activate at very low temperatures. As a result, when several of them are required to be provided in an energy system, they would occupy a significantly large volume, particularly considering their cylindrical shape.

Figure 2:
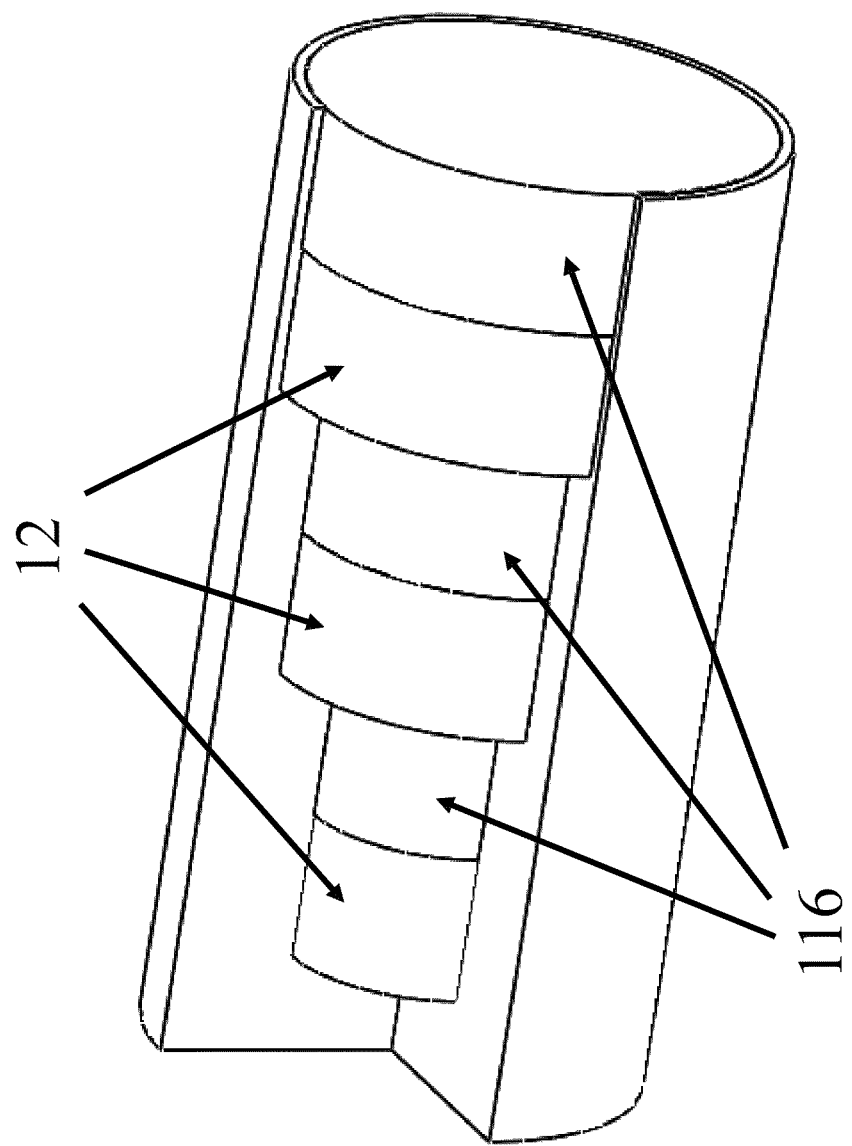
FIG. 2 illustrates a multi-slug type thruster.
Figure 3:
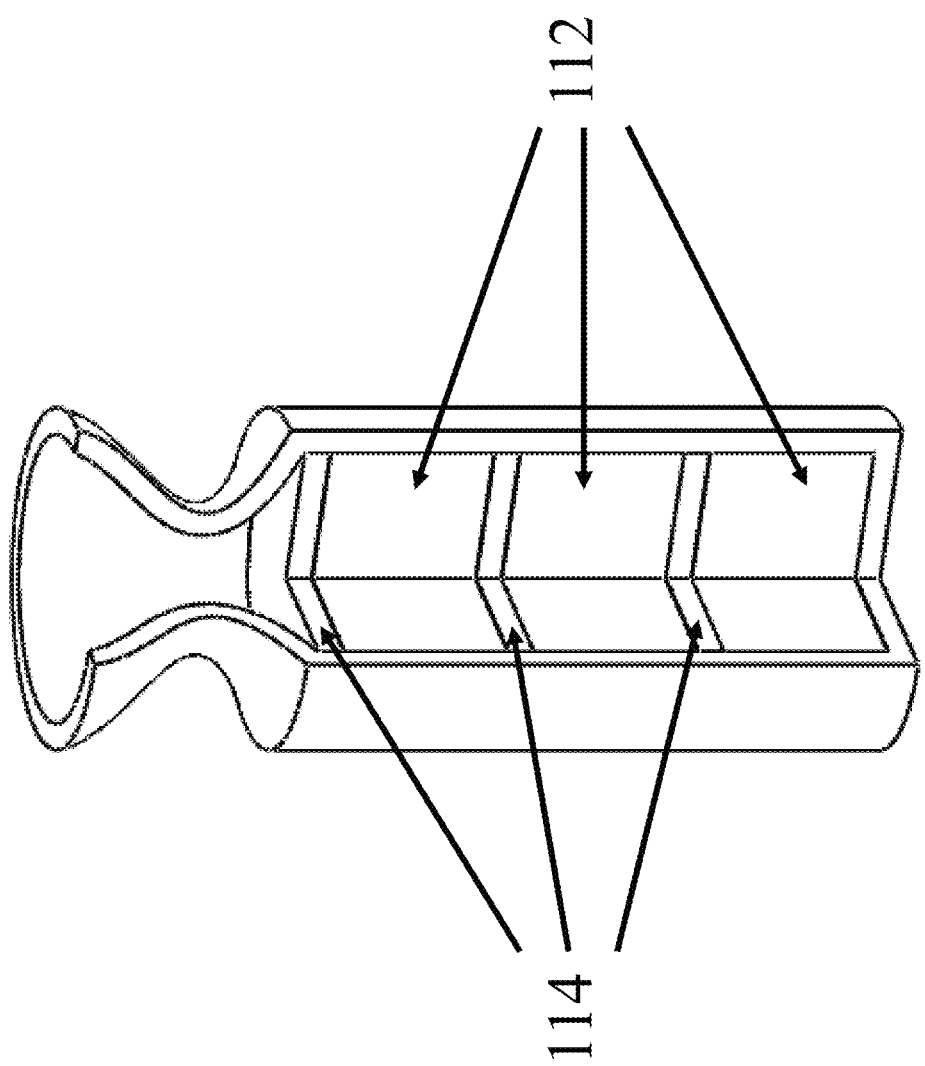
FIG. 3 illustrates a multi-stage nozzle discharge type thruster.

To address the above total thermal battery size issue for the present emplaced munitions energy system in which half a dozen or more such relatively small thermal batteries are to be provided, a multi-stage thermal battery is used similarly to the technology developed for multi-stage thrusters of nozzle and slug type shown in FIGS. 2 and 3, respectively, in which several layers of propellants 112 are packaged in a single thruster and separated by protective layers 114 to avoid sympathetic ignition and allow the individual shots 116 to be ignited at any desired time. In these thrusters, adjacent stages are separated by a layer of compacted alumina powder. In the case of nozzle discharge type thrusters, the alumina layer is capped by a scored metal diaphragm to protect the alumina layer from dispersion following ignition of the propellant covering it.

The technology to prevent sympathetic ignition in multi-stage nozzle discharge type thrusters, as shown in FIG. 3, is being applied herein to multi-cell thermal batteries to allow activation of any individual thermal battery cell that is commanded by the energy system controller 106.

Figure 4:
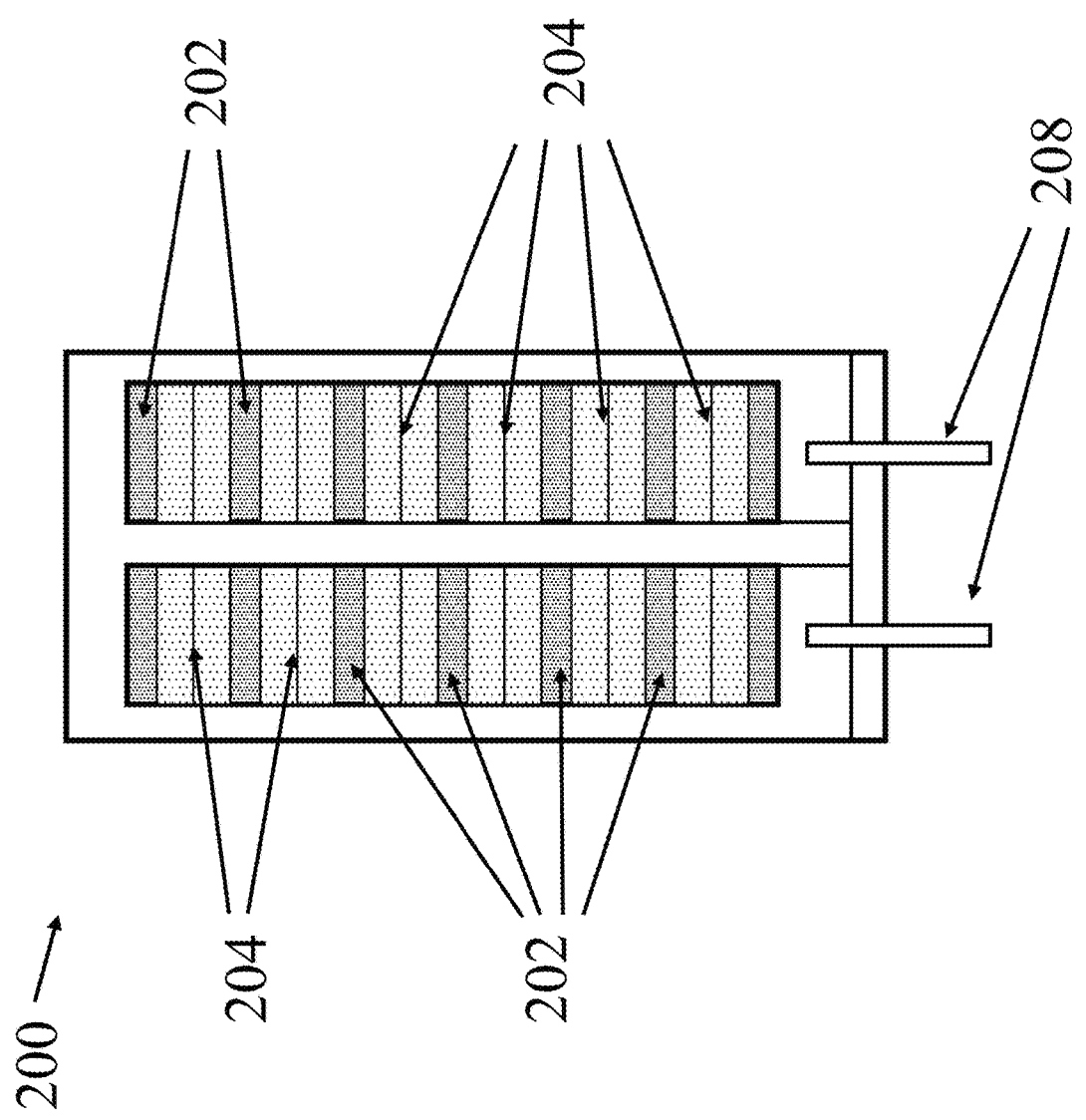
FIG. 4 illustrates an architecture of a multi-cell thermal reserve battery.

A structure of such a multi-cell thermal battery 200 with six individual cells is shown in FIG. 4. The cells 204 are separated by a layer of compacted alumina powder 202 so that initiation of one cell would not initiate its adjacent cells. Here, unlike the multi-stage nozzle discharge type thrusters, no scored metal diaphragm is needed to cap alumina layers since unlike thrusters, initiated thermal battery cells do not generate violent movement of gasses that could dislodge the separating alumina layer. However, if the need arises for rigid capping of the alumina layer, a ceramic disc could be used. The individual cells 204 are initiated electrically on demand by the energy system control unit 106. It is noted that each individual application/mission that is to be powered by a high-pulse power from one of the thermal battery cells 204 of the multi-cell thermal battery 200 of FIG. 4 may demand a different amount of electrical energy. For this reason, the individual thermal battery cells 204 may be configured to provide different current and/or voltage level and/or electrical energy to the terminals 208.

The multi-cell design of the thermal battery 200 to provide high-power pulses of electrical energy has numerous advantages over using individual thermal batteries for each high-power pulse. A first advantage, particularly for the present emplaced munitions energy system and in general for all munitions applications in which such high-power pulses are needed is the significant amount of reduction in the total space that is required for their housing. A rough calculation for a multi-cell thermal battery 200 with six individual cells 204 indicates that the total required volume of the thermal battery casing 206 can be reduced by at least a factor of 3 to 4. Secondly, by increasing the total heat mass of the thermal battery 200, the run time of each individual cell 204 can be increased. Thirdly, it is difficult to manufacture very small thermal batteries for providing the required high-power pulses. Therefore, by using the multi-cell thermal battery 200 shown in FIG. 4, the manufacturing process is significantly simplified and allows currently used manufacturing processes to be used for their production.

Figure 5:
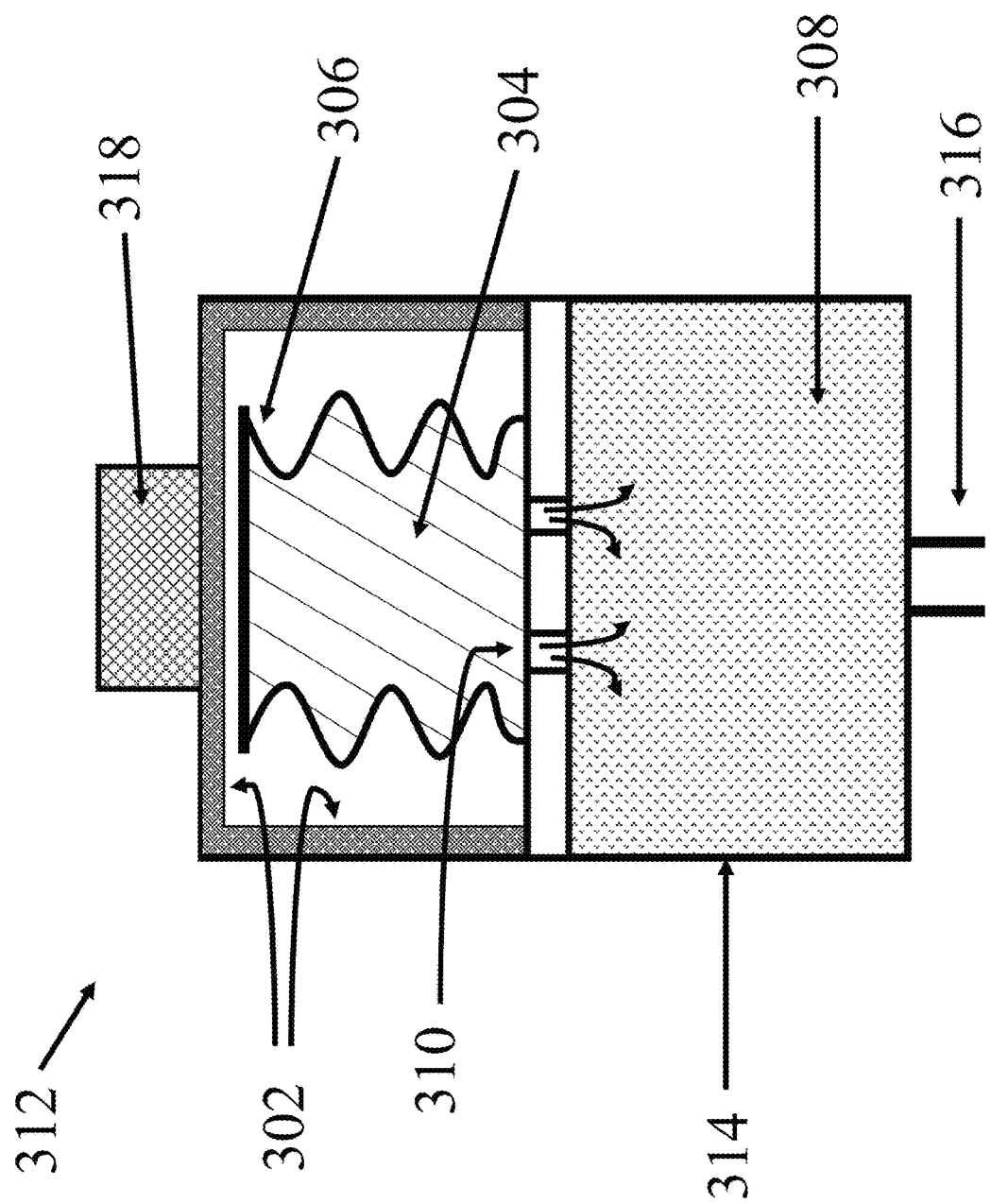
FIG. 5 illustrates a schematic of an activated Li-ion reserve battery.

A design of the Li-ion reserve battery that is proposed to be used to provide low power electrical energy for over 30 days for the present emplaced munitions application is shown in the schematic of FIG. 5. In this class of reserve batteries, pyrotechnic charges are used to heat the separately stored battery electrolyte and inject it under pressure into the battery cell to ensure fast activation and good performance at temperatures as low as the required–54 deg. C. The proposed energy system will then use Omnitek's developed low temperature performance enhancement technology described in the next section of the proposal to keep the Li-ion reserve battery at a room temperature performance level during the munitions 30 days mission.

In the Li-ion based reserve battery 102 of FIG. 5, the pyrotechnic charge 302 serves the following purposes. Firstly, it is used for battery activation, i.e., to release the liquid electrolyte 304 stored in the collapsible storage container 306 into the battery cell 308. Secondly, it generates heat, which is used to heat the electrolyte 304 to allow the battery to function at very low temperatures and at the same time enhance its penetration rate into the battery cell 308 as well as its rate of diffusion. Thirdly, the pressure generated by the initiation of the pyrotechnic material 302 is used to rapidly inject the electrolyte 304 into the battery cell 308 through one or more inlets 110 under pressure to enhance the battery rise time.

The Li-ion reserve battery shown in FIG. 5 is constructed with two separate compartments, a battery cell 308 and an electrolyte storage and injection mechanism compartment 312 housed in a common housing 314 or separate housings fastened together. The battery housing 314 may have a circular or rectangular or other appropriately shaped cross-section having terminals 316 extending therefrom. The liquid electrolyte 304 is stored in the collapsible (bellows-like) metal storage unit 306. Outlet holes 310 are provided on the layer (plate) separating the electrolyte storage unit 312 from the battery cell 308 and are sealed by relatively thin diaphragms (preferably metallic). Pyrotechnic material 302, such as being provided in a layer as shown in FIG. 5, is provided in the sealed volume between the collapsible liquid electrolyte storage unit 306 or on its outside surfaces and the compartment 312 walls. The battery is provided with either an inertial or electrical initiation element 318 for igniting the pyrotechnic material 302 and thereby activating the reserve battery.

The collapsible liquid electrolyte storage unit 306 is configured with a relatively large surface area to allow for rapid transfer of heat to the liquid electrolyte. The storage unit 306 is also configured to deform plastically under the generated pressure from the pyrotechnic material 302 so that once the pressure has subsided, the liquid electrolyte 304 is not returned to the storage unit.

The performance of current Li-ion batteries is significantly degraded at temperatures below zero deg. C., and fall below a few percent of its room temperature as the temperature drops below –20 deg. C. As a result, Li-ion batteries as well as all other available liquid reserve batteries cannot power munitions below –40 deg. C., and certainly not at the required–54 deg. C. that maybe required for an emplaced munitions application.

Figure 6:
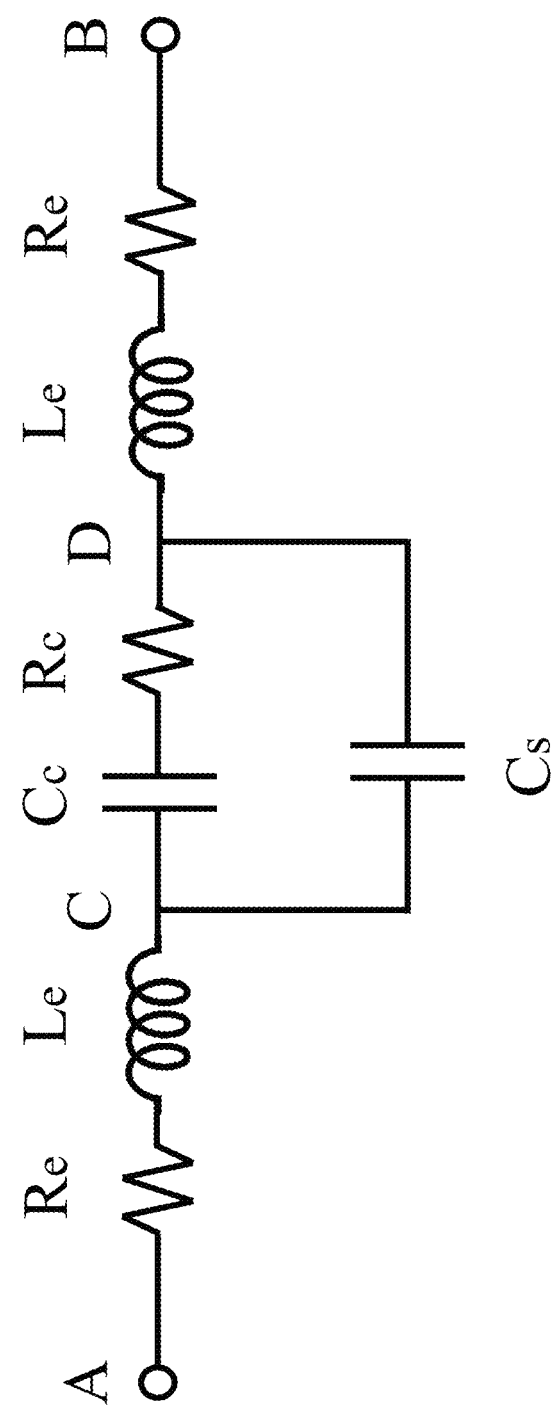
FIG. 6 illustrates an equivalent lumped model of a lithium ion battery.

The basic operation of Li-ion batteries may be modeled with an equivalent (lumped) circuitry shown in FIG. 6. In this model, the resistors $R_e$ and inductances $L_e$ are the electrical resistance against electrons from freely moving in conductive materials with which the electrodes and wiring are fabricated. The equivalent resistor $R_c$ and capacitor $C_c$ (and if significant a corresponding serial inductance $L_c$), respectively, represent the resistance to free movement of lithium ions by the battery electrolyte. The capacitor $C_s$ is the surface capacitance, which can store electric field energy between electrodes, which would act like parallel plates of regular capacitors. In this model, the resistor $R_c$ and capacitor $C_c$ represent the electrical-chemical mechanism of the battery.

In the Li-ion battery model of FIG. 6, the components $R_c$ and $C_c$, are highly sensitive to temperature and the resistance of the resistor $R_c$ increases due to the increase in the "viscous" resistance of the electrolyte to the movement of lithium ions at low temperatures. This increase in resistance degrades its performance at low temperature, making it to be lowered to negligible levels as the temperature drops below –40 deg. C.

Li-ion low temperature performance enhancement technology can be described as follows. Consider the circuit model of FIG. 6. If an AC current with high enough frequency is applied to the battery, due to the low impedance of the capacitor $C_s$, there will be no significant voltage drop across this capacitor, i.e., between the junctions C and D, and the circuit effectively behaves as if the capacitor $C_s$ were shorted. As a result, the applied high frequency AC current essentially passes through the resistors $R_e$ and inductor $L_e$ and not through the $R_c$ and $C_c$ branch to damage the electrical-chemical components of the battery. Any residual current passing through the $R_c$ and $C_c$ branch would also not damage the battery due to its high frequency and zero DC component of the applied current. The high frequency AC current passing through the resistors $R_e$ and inductor $L_e$ will heat the battery electrolyte core, thereby increasing the battery core temperature. In addition, since high frequency AC voltage does not have a net ionic movement, it may have significantly higher peak voltage than the rated battery voltage.

Such Li-ion low temperature charging and performance enhancement technology has been successfully tested at −25 degrees C. to up to −65 degrees C. Thus, the technology can be used to keep the energy system Li-ion based reserve battery 102 at its optimal operating temperature following activation.

It is also noted that as current research efforts yield electrolytes that can operate effectively at lower temperatures of around −20 deg. C., the described Li-ion low temperature charging and performance enhancement technology can be used to bring the battery to its optimal performance level at environmental temperatures of as low as −54 deg. C. or even lower, but using significantly less battery energy consumption.

The Li-ion battery low temperature performance enhancement technologies require no modification to the Li-ion battery; does not damage the battery; the Li-on battery pack protection electronics can be modified to ensure continuous and high-performance operation at low temperatures; eliminates the need for temperature sensors for measuring internal battery temperature; since the battery electrolyte is directly and uniformly heated, significantly less electrical energy is required and significantly faster than is possible by external heating and the technology is simple to implement and low-cost.

Figure 7:
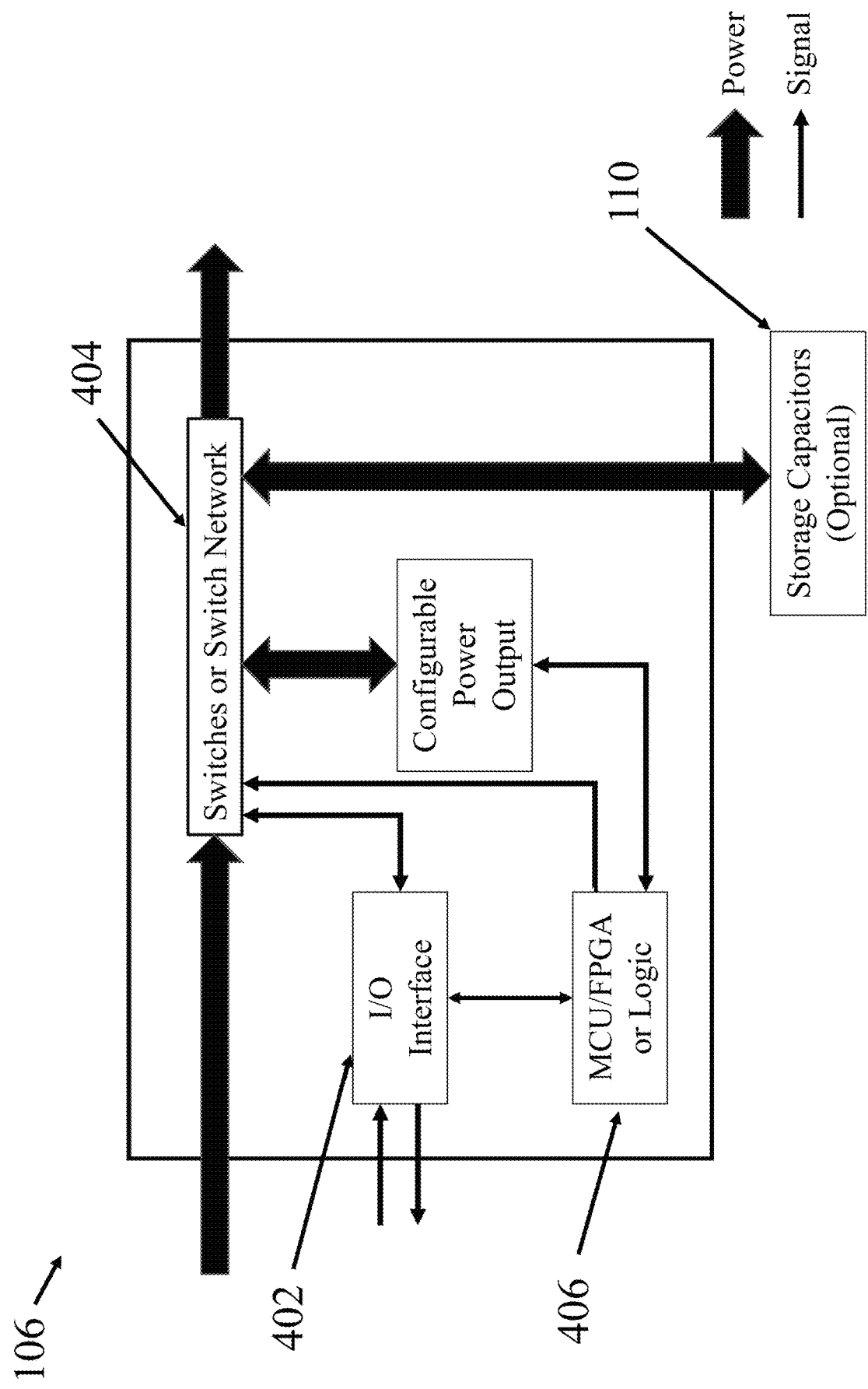
FIG. 7 illustrates a block diagram of a control unit of an energy system.

A block diagram of the energy system control unit 106 is shown in FIG. 7. The control unit 106 contains several building blocks. The building blocks include individual switches 404 that form an array or a switch network. Power input from the batteries can be switched and routed to the output or to charge up the storage capacitors 110 (if provided). The switches 404 are controlled directly or indirectly through the I/O interface 402 by at least one microcontroller, FPGA or Logic circuit 406, the function of which may be performed by the munitions processing and control unit. The switches can also connect the batteries and storage capacitor to power the load when necessary. Switches 404 can be implemented by devices such as MOSFETs, relays or solid-state relays.

The I/O Interface 402 handles the signals in or out of the control unit. One of the output signals is the battery activation signals and the I/O Interface 402 ensures the signals contain enough energy at a rated voltage and current to activate the required number of thermal batteries. The I/O interface 402 also provides the means to monitor the battery status and the total energy consumed and that remains available. The input signals can contain the information regarding status of the batteries and the storage capacitor. In the emplaced munitions application, the loading circuit can communicate with the control unit 106 through the input and output signals.

Although the energy system disclosed herein has particular utility with regard to emplaced munitions, a technology that can reliably provide substantial power in a short amount of time and in extremely harsh conditions and temperatures can be used in other commercial applications.

An Automated External Defibrillator (AED) is a portable electronic device that automatically diagnoses life-threatening cardiac arrhythmias in a patient and treat them through defibrillation (the application of metered electrical current to capture the arrhythmia and allow the heart to reestablish an effective rhythm). Use of AED's have become commonplace, mandated in many cases by regulation or policy, and have saved many lives AEDs are often found at public events and government facilities, including shopping centers, airports, restaurants, casinos, hotels, sports stadiums, schools and universities, community centers, fitness centers, health clubs, theme parks, workplaces and any other location where people may congregate. A trend is also developing to purchase and use AED's in the home, particularly by those with known existing heart conditions. AEDs are dependent upon a trickle-charged interior battery and may sit for long periods without ever being used. Maintenance evolutions require that AEDs are periodically checked and batteries replaced—incurring personnel training, material costs, labor costs, and disposal costs. However, a reliable inert battery technology such as the reserve cell technology disclosed above can reduce maintenance burdens and costs as the technology can be unattended without sacrificing reliability. Additionally, application of the reserve cell in AEDs mean that AEDs can be located in locations without AC service to trickle charge AED batteries, including sporting events that do not take place in a stadium, such as at high school sporting events or by emergency workers who need to defibrillate a patient in remote areas.

Combustion engines are particularly dependent on batteries for starting. Engines performing critical functions, such as marine propulsion, heavy equipment, compressors, water pumps, aircraft, trucks, military vehicles, emergency service vehicles and automobiles would benefit from a reliable, unattended backup emergency power source to provide emergency starting power when conventional means are unable. Particularly in severe and inclement conditions, including wet and icing conditions, the reserve cell technology disclosed above would find application.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A thermal battery comprising:
   a housing;
   two or more battery cells provided in the housing, each of the two or more battery cells being initiated separately;
   a separation layer provided between each adjacent battery cells of the two or more battery cells for preventing initiation of one of the two or more battery cells when an other of the two or more battery cells is initiated; and
   battery terminals extending from the housing and electrically connected to each of the two or more battery cells.

2. The thermal battery of claim 1, wherein the separation layer is a compacted alumina powder.

3. The thermal battery of claim 1, wherein each of the two or more battery cells are configured to provide one or more of a different current, a different voltage level and a different electrical energy to the battery terminals.

\* \* \* \* \*